United States Patent [19]
Erickson et al.

[11] Patent Number: 5,920,407
[45] Date of Patent: Jul. 6, 1999

[54] METHOD AND APPARATUS FOR APPLYING TONAL CORRECTION TO IMAGE DATA

[75] Inventors: Michael D Erickson, Ft Collins; Dan S Johnson, Greeley, both of Colo.

[73] Assignee: Hewlett-Packard Company, Palo Alto, Calif.

[21] Appl. No.: 08/781,782

[22] Filed: Jan. 9, 1997

[51] Int. Cl.⁶ .................................................. H04N 1/46
[52] U.S. Cl. .......................... 358/504; 358/515; 358/523
[58] Field of Search ..................... 358/504, 515, 358/523, 518, 516, 505; 382/254, 317

[56] References Cited

U.S. PATENT DOCUMENTS

| | | | |
|---|---|---|---|
| 4,424,589 | 1/1984 | Thomas et al. | 382/317 |
| 4,709,144 | 11/1987 | Vincent | 250/226 |
| 4,748,316 | 5/1988 | Dickson | 235/454 |
| 4,839,721 | 6/1989 | Abdulwahab et al. | 358/518 |
| 4,870,268 | 9/1989 | Vincent et al. | 250/226 |
| 4,926,041 | 5/1990 | Boyd | 250/226 |
| 5,038,028 | 8/1991 | Boyd et al. | 250/208.1 |
| 5,075,770 | 12/1991 | Smyth | 358/516 |
| 5,185,661 | 2/1993 | Hg | 358/505 |
| 5,227,620 | 7/1993 | Elder, Jr. et al. | 250/208.1 |
| 5,336,878 | 8/1994 | Boyd et al. | 250/208.1 |
| 5,719,965 | 2/1998 | Degi et al. | 382/254 |
| 5,748,105 | 5/1998 | Kelly | 340/870.21 |
| 5,773,814 | 6/1998 | Phillips et al. | 250/208.1 |

*Primary Examiner*—Christopher S. Kelley
*Assistant Examiner*—Sheela Chawan

[57] ABSTRACT

An imaging system for applying separate color tonemaps comprises an optical scanning assembly configured to scan an object and produce image data having a first resolution that corresponds to a color characteristic. A memory device associated with the imaging system stores a look-up table that corresponds to a predetermined transfer function. An image data processor operatively associated with the memory device and the optical scanning assembly alters the resolution of the image data having the first resolution to produce image data having a second resolution, the second resolution being less than the first resolution, and also applies the image data having the second resolution to the look-up table to look up LowPoint image data having a third resolution, the third resolution being greater than the second resolution.

18 Claims, 7 Drawing Sheets

METHOD AND APPARATUS FOR APPLYING TONAL CORRECTION TO IMAGE DATA

FIELD OF INVENTION

This invention relates to optical scanners in general and more specifically to a system and method for applying tonal adjustment to scanned image data.

BACKGROUND

A color imaging device (e.g., an optical scanner) produces color image data signals representative of an object or document being scanned by projecting an image of the object or document onto a photosensitive detector array. The color image data signals may then be digitized and/or stored for later use. For example, the color image data signals may be used by a personal computer to produce an image of the scanned object on a suitable display device, such as a CRT. Alternatively, the color image data may be printed on a color printer.

A typical imaging device (e.g., an optical scanner), includes illumination and optical systems to illuminate the object and focus a small area of the illuminated object, usually referred to as a "scan line," onto the surface of a photosensitive detector positioned within the scanner. Image data representative of the entire object may then be obtained by sweeping the illuminated scan line across the entire object, either by moving the object with respect to the illumination and optical assemblies or by moving the illumination and optical assemblies relative to the object. The illumination system may include a suitable white light source (e.g., a fluorescent or incandescent lamp) to illuminate the object, whereas the optical system may include a lens assembly to focus the image of the illuminated scan line onto the surface of the detector.

The photosensitive detector array may comprise a charge-coupled device (CCD), although other devices may also be used. A typical CCD may comprise a large number of individual cells or "pixels," each of which collects or builds-up an electrical charge in response to exposure to light. Since the size of the accumulated electrical charge in any given cell or pixel is related to the intensity and duration of the light exposure, a CCD may be used to detect light and dark spots on an image focused thereon. In a typical scanner application, the charge built up in each of the CCD cells or pixels is measured and then discharged at regular intervals known as sampling intervals, which may be about 5 milliseconds or so for a typical scanner, although other sampling intervals may be used.

The term "image light" as used herein refers to the light that is focused onto the surface of the detector array by the lens assembly. Depending on the type of scanner, the image light may be reflected from the document or object being scanned or it may be transmitted through the object or document. The image light is converted into digital signals in essentially three steps. First, each pixel in the detector converts the light it receives into an electric charge. Second, the charges from the pixels are converted into analog voltages by an analog amplifier. Finally, the analog voltages are digitized by the analog-to-digital (A/D) converter. These digital signals may then be processed and/or stored as desired.

Color optical scanners usually operate by collecting multiple color component images of the object being scanned. For example, data representative of red, green, and blue color components of the image light may be produced by the scanner apparatus. The particular color components, e.g., red, green, and blue, are commonly referred to as primary colors, primary stimuli, or simply, primaries. As is well-known, various combinations of three such primary colors can be used to produce any color stimulus contained within the gamut of colors on the CIE chromaticity diagram that lie within the triangle of primaries. The amounts of each primary color required to match a particular color stimulus are referred to as tristimulus values. Written mathematically:

$$C \equiv r(R) + g(G) + b(B)$$

Put in other words, a given color stimulus C (e.g., the color of a given pixel) can be matched by r units of primary stimulus R (red), g units of primary stimulus G (green), and b units of primary stimulus B (blue). All the different physical stimuli that look the same as the given color stimulus C will have the same three tristimulus values r, g, and b. Thus, it is possible to match a color stimulus by a mixture of three primary colors or stimuli, with the tristimulus values r, g, and b determining the required amount of each primary color. It is important to keep in mind that the foregoing method will only achieve psychophysical color match (i.e., the color will appear the same to the human eye), as opposed to a physical or spectral match.

Many different techniques may be used to collect data representative of the multiple color component images (i.e., the tristimulus values) of the object being scanned. One technique is to project the image of the illuminated scan line onto a single linear detector array. The multiple color component images (i.e., the tristimulus values) of the illuminated scan line may be collected by illuminating the object being scanned with a different color light source (a primary) on each of three successive scans. For example, the object first may be scanned using only red light, then only green light, and finally only blue light. The output signal from the detector for each color thus represents the tristimulus value for that color. In a variation of this technique, three scanning passes may be made using a white light source, but the image light from each scan is filtered by a different color filter before being focused onto the optical detector array. Either way, the tristimulus values for the primaries (i.e., the red, green, and blue colors) may be determined from the output signals from the detector.

Another technique, described in U.S. Pat. No. 4,709,144 issued to Vincent and U.S. Pat. No. 4,926,041, issued to Boyd, et al., both of which are hereby specifically incorporated by reference for all that is disclosed therein, is to split the image light comprising the scan line into multiple color component beams, each of which is then focused onto a separate linear detector array. For example, the image light comprising the scan line may be split into red, green, and blue color component portions which are then simultaneously projected onto three separate linear detector arrays. The output from each detector array represents the tristimulus value for the corresponding primary. This technique allows the tristimulus values from any particular scan line to be generated simultaneously, thus allowing easier correlation of the image data for each separate primary.

Regardless of the particular technique used to collect the tristimulus values, one factor that affects the color balance and overall quality of the scanned image is the illumination resolution of the scanner. Essentially, the illumination resolution is a measure of the number of different intensity levels that can be detected and recorded by the scanner. For example, an image scanner utilizing an 8-bit analog-to-digital (A/D) converter to convert the analog signals from the detector array into corresponding digital signals is capable of representing 256 different intensity levels. The A/D converter returns a maximum value of 255 for a maximum intensity or "white" pixel and a minimum value of 0 for a minimum intensity or "black" pixel. Accordingly, a scanner's "white intercept" or "white point," is the intensity of image light that results in a full scale output from the analog-to-digital (A/D) converter of the scanner. Similarly, the "black intercept" or "black point" is the intensity of the image light (neglecting noise) at which the A/D converter returns a value of zero. Image light having an intensity of 50% of the white intercept value will cause the 8-bit A/D converter to return a value of 127. Therefore, the bit depth of the A/D converter and the difference between the white and black intercepts determines the tonal resolution of the scanner.

Unfortunately, however, it is common that a majority of the scanned image only utilizes a portion of the tonal (i.e., illumination) resolution of the scanner. For example, a very dark image (e.g., an image comprising a majority of pixels having from between 0% and 50% reflectance) does not fully utilize the values set aside for regions of the image having 50% to 100% reflectance. That is, since the intensity values are linearly spaced, the same number of intensity values is set aside for the dark regions as for the light regions.

The foregoing intensity resolution problem exists in both monochrome (i.e., black and white) as well as color scanners, except that in a color scanner the problem exists with respect to each of the separate color components. Consequently, scanned images, particularly dark ones, suffer from quantization effects due to the limited number of digital levels used in the scan.

One method for reducing the quantization effects due to the limited number of digital intensity levels is to expand the brightness sensitivity in some parts of the reflectance space (e.g., the dark regions) and to compress other parts of the reflectance space (e.g., the light regions). This is referred to herein as tonal correction. One example of such tonal correction is "gamma correction" in which the image data are transformed in accordance with a predetermined, usually non-linear, transfer function. Besides reducing quantization effects, such gamma correction techniques can also improve overall color balance of the scanned image by more closely matching the image characteristics with those of the receptors of the human eye.

Tonal correction is typically applied to image data by using a look-up table stored in the memory system (e.g., RAM) associated with the scanner. Since the amount of RAM is limited, most scanners utilize only a single look-up table. With regard to color scanners, the use of a single look-up table can result in undesired color shifting which is typically manifested as a reduction in the color fidelity of the image. The use of a single look-up table also cannot correct for variations in spectral sensitivity of the detector array or for variations in the colored lights or colored filters used to derive the three color components (e.g., red, green, and blue) of the image. The memory limitation also typically limits the resolution of the look-up table. For example, most image scanners utilize an 8-bit to 8-bit look-up table which transforms or re-maps each of the 256 intensity levels to a new level, again spread over 256 levels. However, since adjacent levels in areas that are being expanded will now be mapped into output levels that are separated by most likely a few levels, several possible output levels will be skipped, which can cause objectionable contouring effects in the resulting image.

While it is possible to provide such color correction in the image editing software resident on the host computer, it is usually disadvantageous to do so. For example, many scanners internally represent the scanned image data in 10 or 12 bit words. However, since most host computers will only accept input data having 8-bit words, the scanner will re-format the image data into 8-bit words before sending it to the host computer. As a result, much information is lost, decreasing the resolution of the image data. Accordingly, any subsequent image processing operations will be limited by the resolution of the 8-bit image data.

Consequently, there is a need for an improved method and apparatus for applying tonal correction to color image scanners. Such an improved method and apparatus should be capable of applying several different tonal correction functions to the image data to compensate for varying spectral sensitivity of the detector array and to compensate for non-linearities in the receptors of the human eye, but without significantly increasing the amount of memory or processing capacity required to apply the tonal correction. Additional advantages could be realized if such tonal correction could be performed without producing its own distortions and quantization effects due to limited resolution of the look-up table.

SUMMARY OF THE INVENTION

An imaging system for applying separate color tonemaps may comprise an optical scanning assembly configured to scan an object and to produce image data having a first resolution that corresponds to a color characteristic. A memory device associated with the imaging system stores a look-up tables that corresponds to a predetermined color transfer function. An image data processor operatively associated with the memory device and the optical scanning assembly alters the resolution of the image data having the first resolution to produce image data having a second resolution, the second resolution being less than the first resolution, and also applies the image data having the second resolution to the look-up table to look up LowPoint image data having a third resolution, the third resolution being greater than the second resolution.

Also disclosed is a method for processing image data having a first resolution produced by an imaging device, wherein the image data corresponds to a color characteristic. The first step in the method is to provide to the imaging device a look-up table which is representative of a predetermined transfer function. Next, the image data having the first resolution are altered to produce image data having a second resolution that is less than the first resolution. Image data having the second resolution are then applied to the look-up table to look up LowPoint image data having a third resolution, the third resolution being greater than the second resolution.

BRIEF DESCRIPTION OF THE DRAWINGS

Illustrative and presently preferred embodiments of the invention are shown in the accompanying drawings in which:

FIGS. 8(a–c) are graphical representations of three possible gamma correction transfer functions used to correct the intensity of the red, green, and blue color components of the scanned image data;

DETAILED DESCRIPTION OF THE INVENTION

An imaging system 10 for applying separate color tonemaps (i.e., transfer functions) according to the present invention may be used to provide any desired, user-selectable color correction function to the image data produced by the imaging system 10. Separate tonemaps or transfer functions may be applied to each individual color component or characteristic (i.e., red, green, and blue) of the color image data. Accordingly, the imaging system 10 can correct the color image data to compensate for variations in spectral sensitivity of the imaging device itself, for non-linearities in the receptors of the human eye, as well as for variations in the device on which the scanned image will be displayed, be it a CRT or LCD display or a color printer. The color correction is accomplished by the scanner image processing system and is applied to the relatively high bit resolution image data before it is converted and formatted to the relatively low bit resolution image data that is compatible with the host computer.

Figure 3:
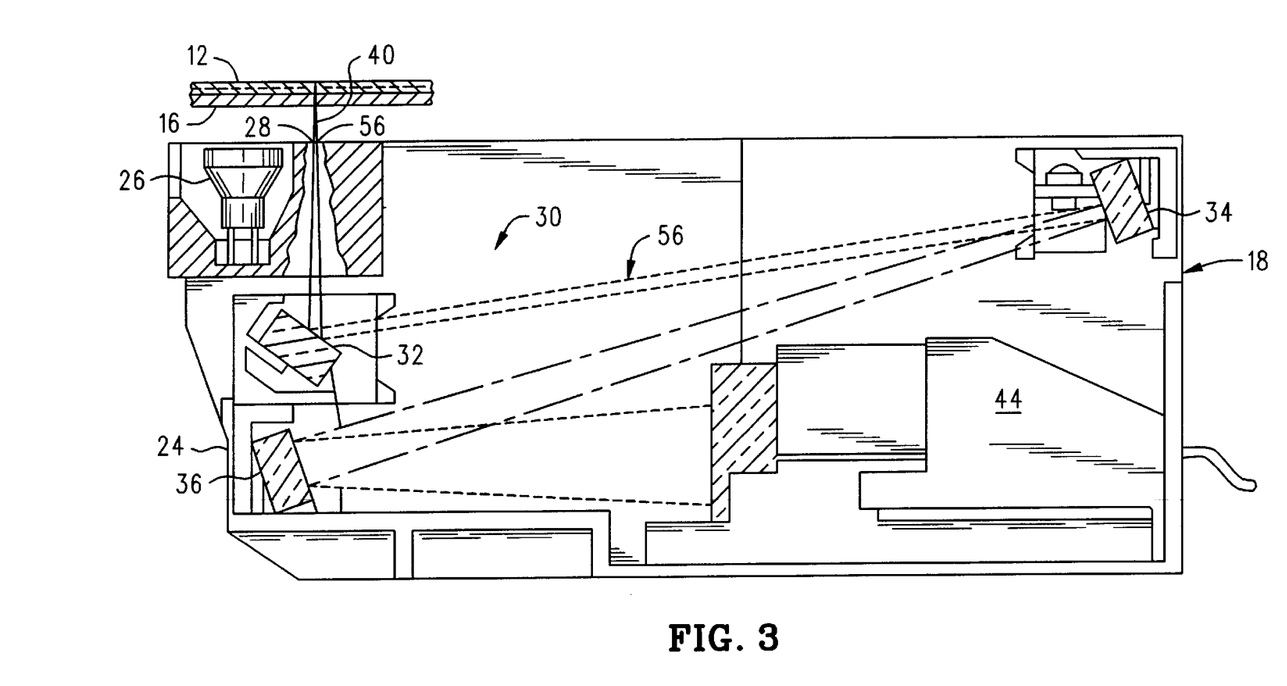
FIG. 3 is a cross-section view in elevation of the carriage assembly of the imaging system shown in FIGS. 1 and 2.
Figure 4:
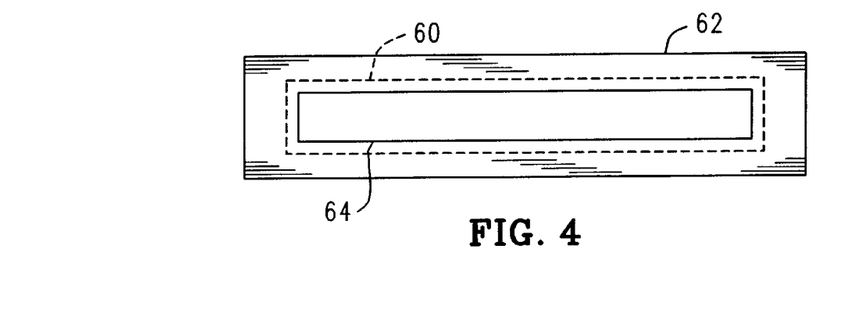
FIG. 4 is a plan view of a detector array used in the imaging system.
Figure 5:
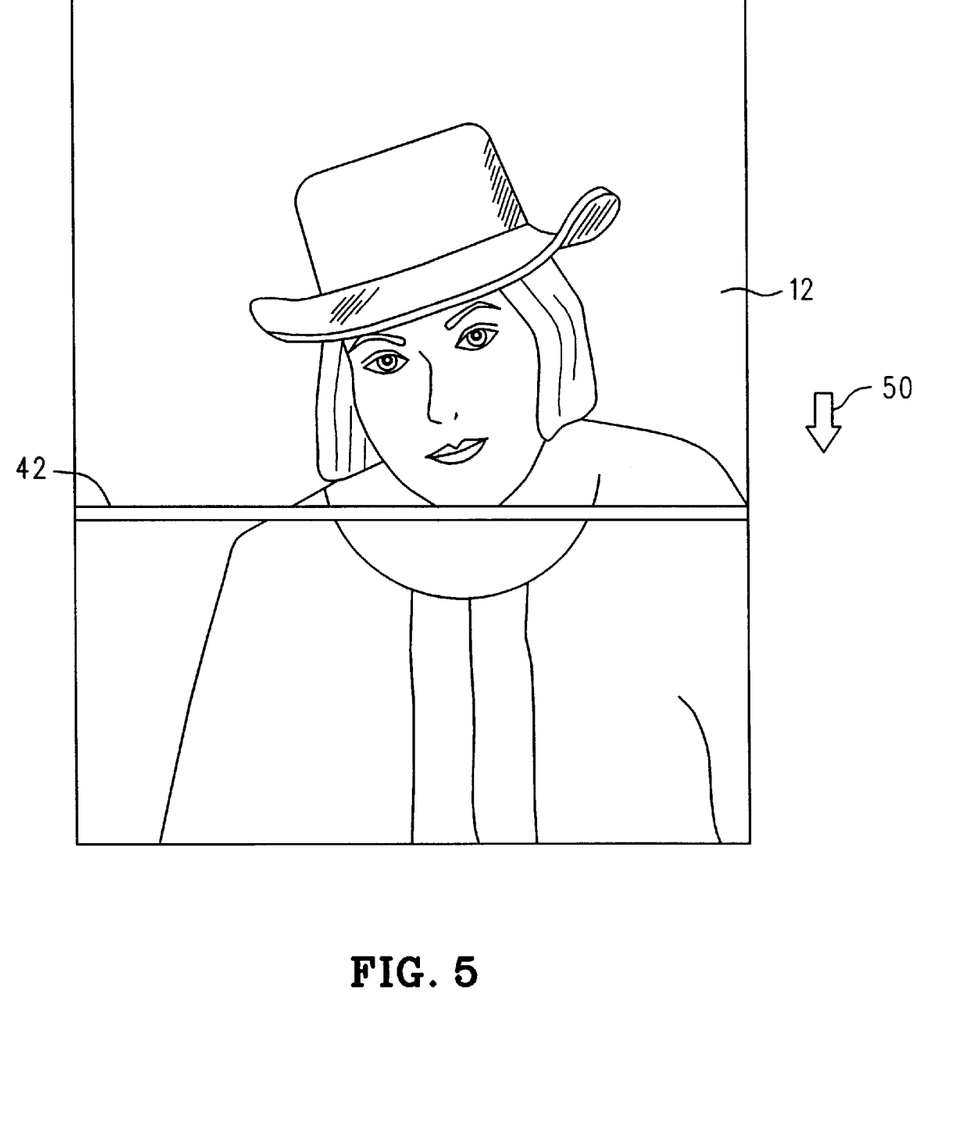
FIG. 5 is a plan view of a document which is being scanned by an imaging device which illustrates the movement of the scan line across the document.

Referring now to FIGS. 1–4 the imaging system 10 may comprise a color optical scanner which produces machine readable color image data representative of a color image of an object 12, such as a sheet of paper with color graphic provided thereon, as illustrated in FIG. 5. The imaging system or scanner 10 may include a housing 22 having a top panel 14 to which is mounted a transparent platen 16 for supporting the object 12 (FIG. 5) to be scanned. The imaging system or scanner 10 may also include a carriage assembly 18 mounted so that it can be moved back and forth underneath the transparent platen 16 along a scanning axis AA to accomplish the function of scanning the object 12.

Figure 1:
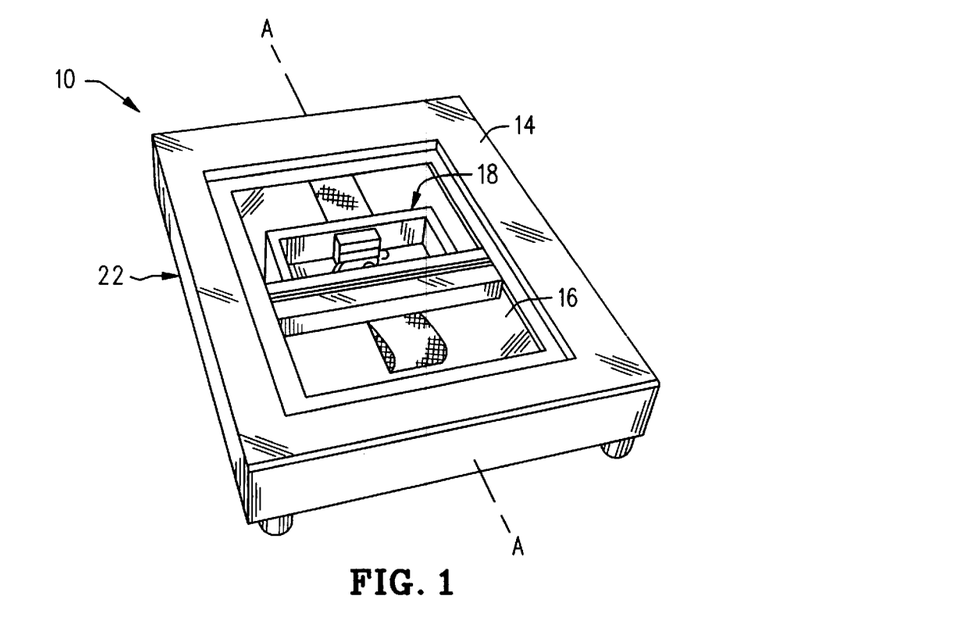
FIG. 1 is a perspective view of an imaging system for applying separate color tonemaps to image data.
Figure 2:
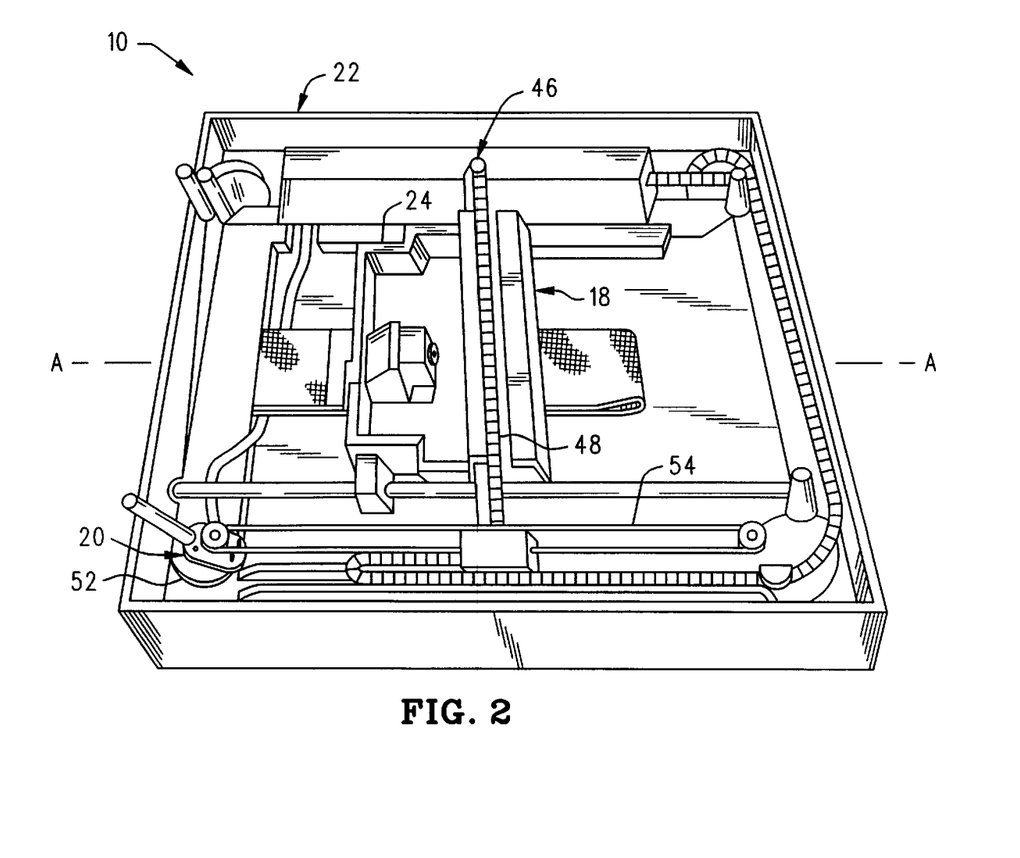
FIG. 2 is a perspective view of the imaging system shown in FIG. 1 with the top panel removed to show the moveable carriage assembly.

Referring now to FIGS. 2–4, the housing 22 of optical scanner 10 may include a suitable displacement assembly 20 to which is mounted the moveable carriage assembly 18. The displacement assembly 20 moves the carriage assembly 18 back and forth underneath the transparent platen 16. In one embodiment, the carriage assembly 18 may comprise a chassis 24 for receiving a multicolor light source assembly 26, an optional slit aperture assembly 28, as well as the various components of the optical system 30, including respective first, second, and third mirrors 32, 34, and 36, as well as a lens assembly 38. The function of the optical system 30 is to direct and focus light rays or image light 40 reflected from the scan line 42 (FIG. 5) onto the light sensitive surface 64 of a suitable detector array 62, such as a CCD, mounted within detector assembly 44. The imaging system or scanner 10 may also include a suitable electronic control and image data processing system 46 (FIG. 6) for controlling the various components and functions of the scanner 10 and for transforming the color image data produced by the detector assembly 44 according to the transfer functions stored in the random access memory (RAM) system 68. A host computer 48 (FIG. 6) may be connected to the scanner 10 via a suitable host interface system 53 and may receive transformed image data from the scanner 10. The transformed image data may then be stored on the host computer system 48 and/or processed by suitable image editing software 79 (FIG. 7).

Figure 6:
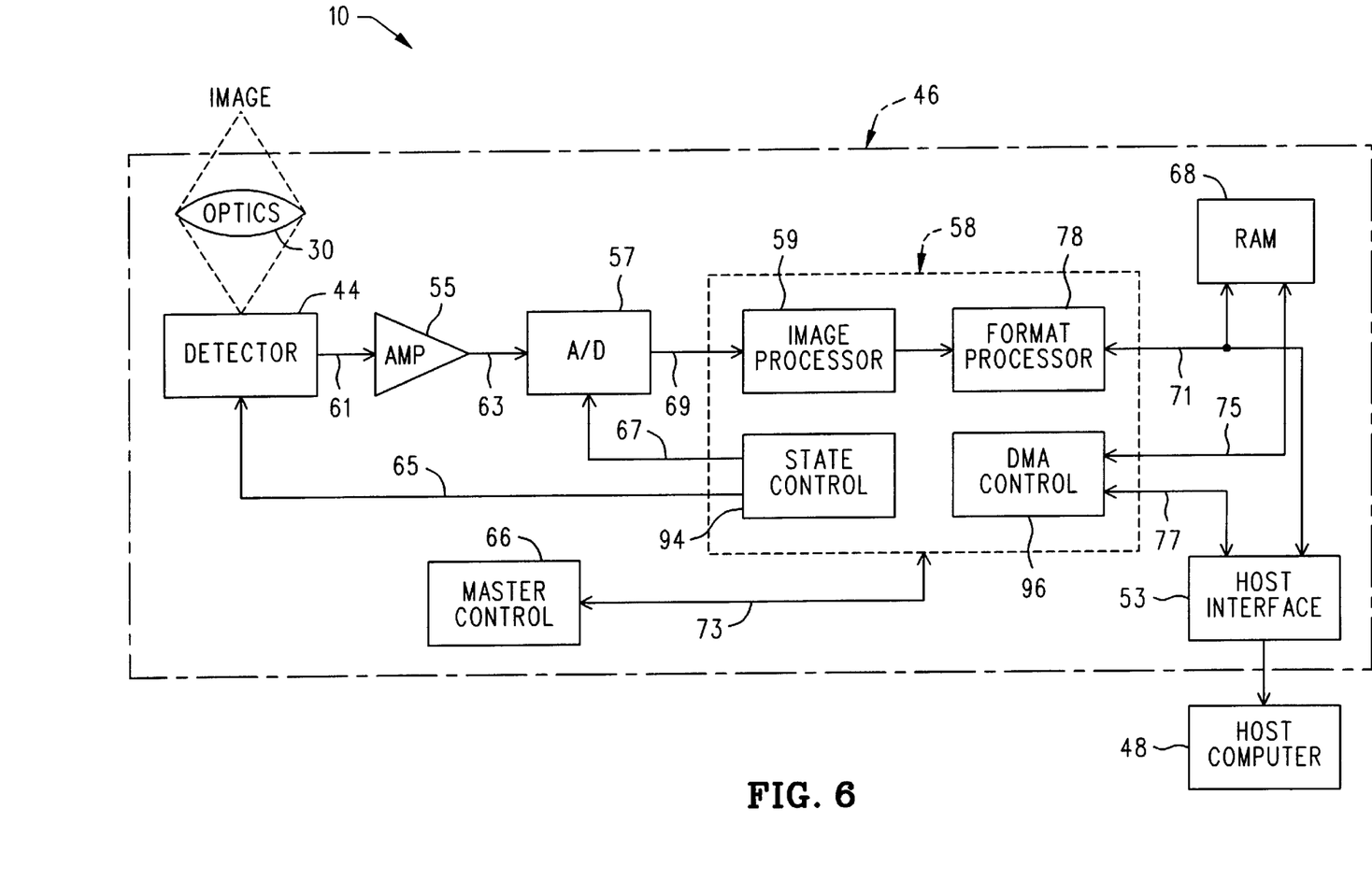
FIG. 6 is a high-level block diagram of an imaging system for applying separate color tonemaps to captured image data.
Figure 7:
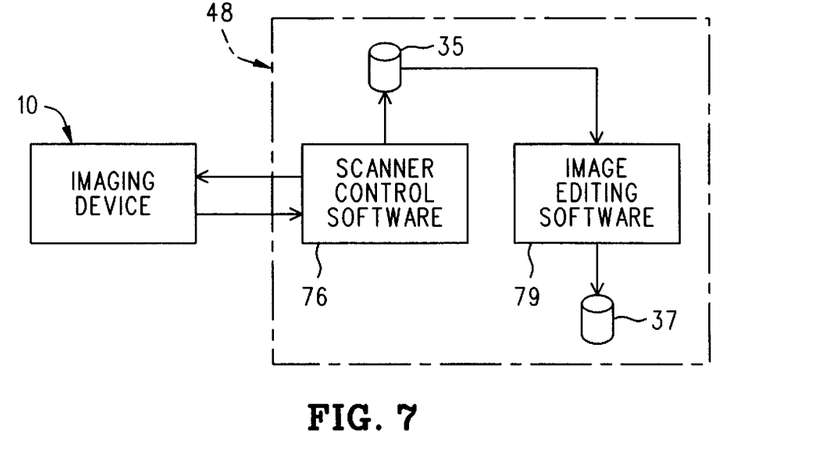
FIG. 7 is a high level block diagram showing the interrelation of the imaging system with scanner control software and image editing software contained on a host computer.

The electronic control and image data processing system 46 shown in FIG. 6 captures image data from the detector system 44 and transforms the captured image data according to the transfer functions previously stored in the RAM 68. Essentially, the electronic control and image data processing system 48 includes an analog amplifier 55, an analog-to-digital (A/D) converter 57, a slave controller 58, a master controller 66, the random access memory (RAM) 68, and the host interface 53. The electronic control and image data processing system 48 may also include circuitry and devices (not shown) for controlling the various components of the scanner 10 (e.g., the carriage assembly 18, light source assembly 26, etc.). However, such circuitry and devices (not shown) will not be described in further detail since they are well-known to persons having ordinary skill in the relevant art and are not necessary to the appreciation and understanding of the invention.

As will be described in greater detail below, the electronic control and image data processing system 46 captures the image data from the A/D converter 57 and processes it as necessary so that it may be received by the host interface 53 and, ultimately, the host computer 48. The electronic control and image data processing system 46 also transforms the image data according to a plurality of user-programmable transfer functions to provide a desired improvement in image quality. In one preferred embodiment, the transfer functions are user selectable and may be provided to the RAM 68 via the scanner control software 76 (FIG. 7). For example, the transfer functions may comprise three separate gamma correction functions or tonemaps: A red gamma correction function or tonemap 70, a green gamma correction function or tonemap 72, and a blue gamma correction function or tonemap 74. See FIGS. 8(a–c). Each transfer function (in this case gamma correction function 70, 72, 74) is applied to the corresponding color component of the scanned image data. That is, the red component of the color image data is transformed according to the red tonemap 70, the green component is transformed according to the green tonemap 72, and the blue component is transformed according to the blue tonemap 74. After the transformations are complete, the transformed image data are then formatted as necessary by the host interface 53 so that they are compatible with the host computer 48.

Figure 9:
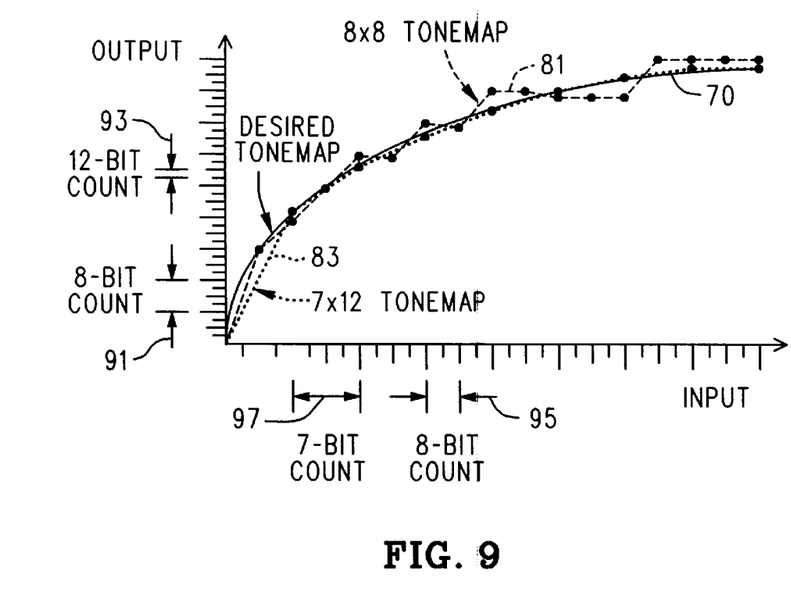
FIG. 9 is an enlarged graphical representation of the red gamma correction transfer function shown in FIG. 8(a) along with graphical representations of that transfer function in 8-bit by 8-bit space and 7-bit by 12-bit space.
Figure 10:
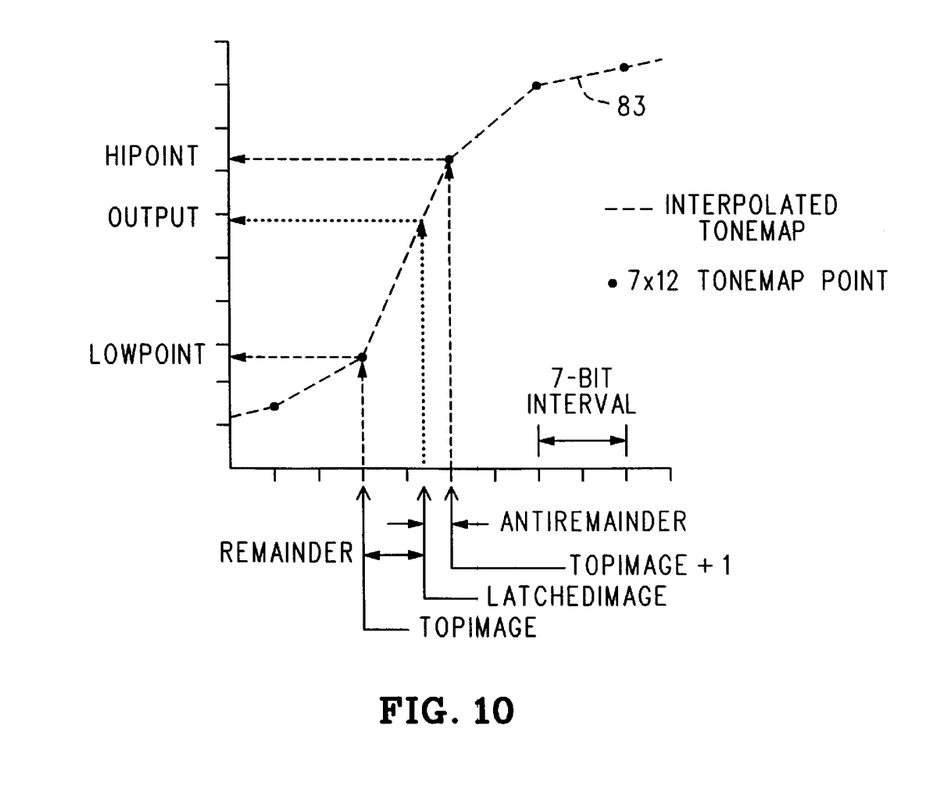
FIG. 10 is a graphical representation of the linear interpolation method according to the present invention on a 7-bit by 12-bit look-up table.

As will also be described in greater detail below, the various transfer functions are stored in the RAM 68 as 7-bit by 12-bit look-up tables (FIG. 9). The input (i.e., scanned) image data are converted into output or transformed image data by applying the input data to the 7-bit by 12-bit look-up table and by using a linear interpolation algorithm to determine the output or transformed image data, as best seen in FIG. 10.

Figure 11:
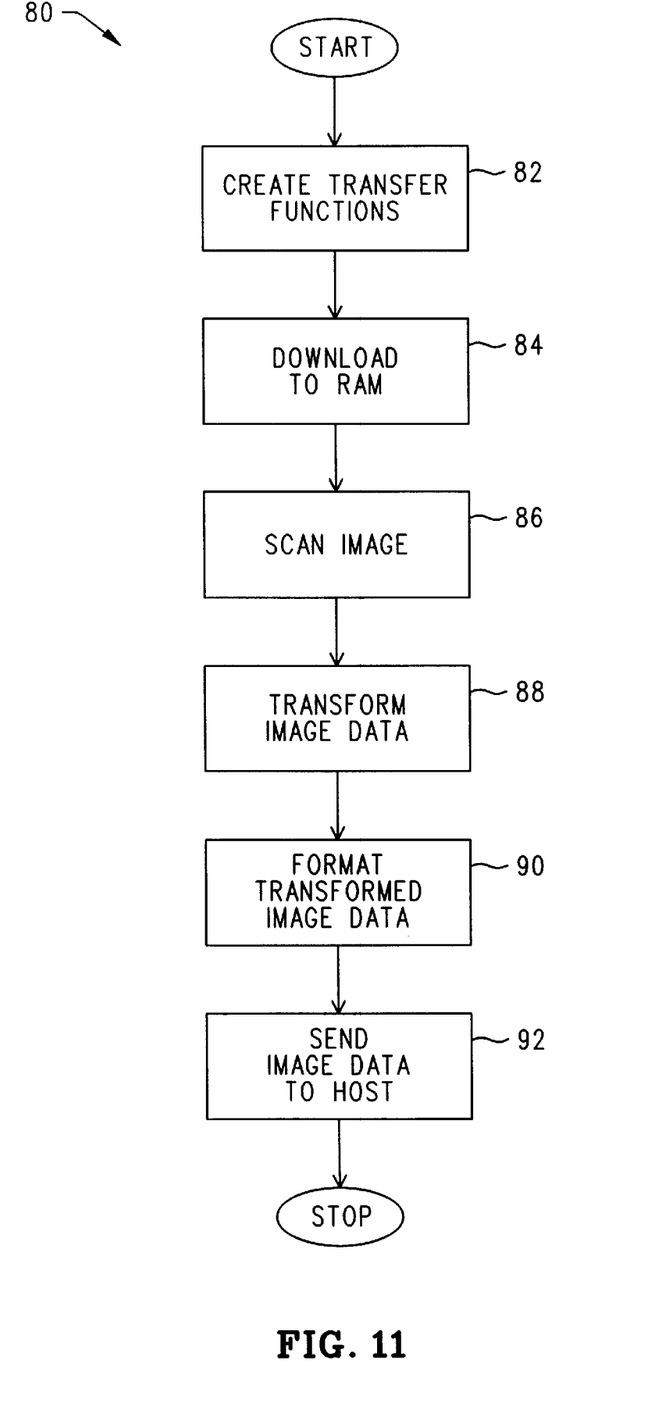
FIG. 11 is a flow-chart showing the method for applying separate color tonemaps to image data.

In one preferred embodiment, the imaging system 10 according to the present invention may be operated according to the process steps shown in FIG. 11. Essentially, the method 80 for processing image data by applying separate transfer functions includes the step 82 of creating the transfer functions to be applied. As will be explained below, the particular transfer functions may be created by the user or may be selected by the user from a plurality of preprogrammed transfer functions which have been supplied with the scanner control software 76. In any event, once the user has either created or selected the desired transfer functions at step 82, the transfer functions are then downloaded onto the RAM 68 at step 84. Then, at any time subsequent to the downloading step 84, the scanner 10 may be actuated to scan the document 12 (FIG. 5). As the document 12 is being scanned, analog image data from the detector 44 are amplified by amplifier 55 and converted into digital image data by the analog-to-digital (A/D) converter 57. The digital image data may then be stored in RAM 68 or may be transformed "on the fly" by the image processor 59. The image processor 59 transforms the digital image data at step 88 by applying the data to the appropriate transfer function previously stored in RAM 68 as a 7-bit by 12-bit look-up table. For example, the red digital image data will be transformed by applying them to the appropriate transfer function previously input for red image data. Similarly, the green digital image data will be transformed by applying them to the previously input "green" transfer function, and so on. After all the image data have been transformed, they are then formatted, if necessary, at step 90 to place the data in a form suitable for transfer to the host computer 48. For example, in one preferred embodiment, the transformed image data comprise 12-bit image data, but the host computer 48 will only accept 8-bit data. Therefore, the 12-bit transformed image data are converted into 8-bit image data by the format processor 78 (FIG. 6). The formatted, transformed image data may then be sent to the host processor 48 via a suitable host interface 53 at step 92.

Figure 8A:
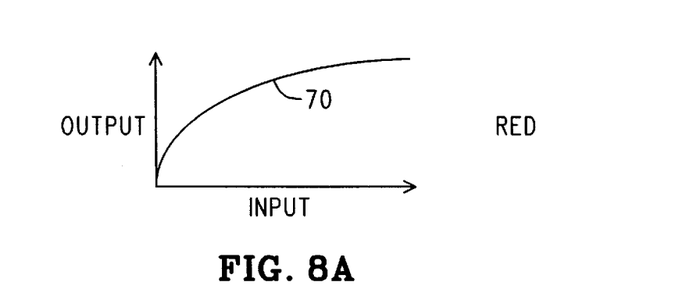
Figure 8B:
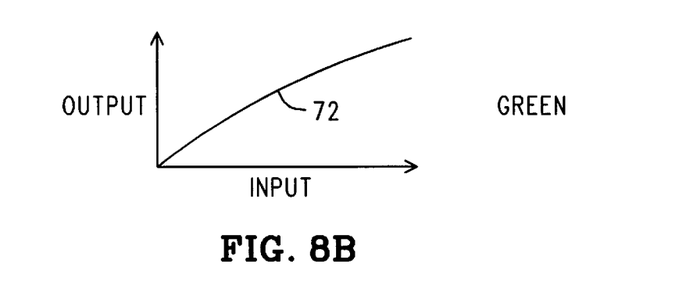
Figure 8C:
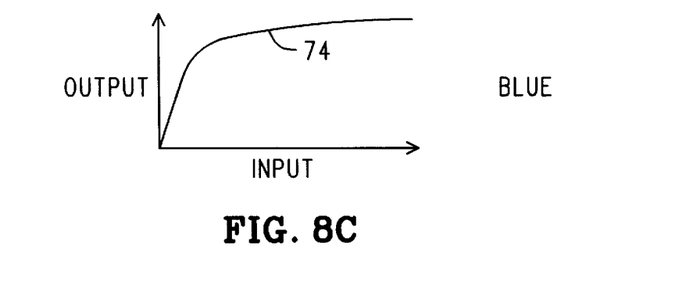

A significant advantage of the present invention lies in the ability to apply a separate transfer function to each individual color component of the color image data. If intensity correction is desired, each transfer function may comprise a gamma correction function or tonemap, similar to those shown in FIGS. 8(a–c). Besides compensating for quantization effects resulting from dark images, such gamma correction functions can also correct for non-linearities and/or distortions imposed by the various image components. For example, the CCDs that are typically used to produce the electric signals from the image light do not have uniform spectral response. That is, the CCD may be more sensitive to green light than to red or blue light. Consequently, the color balance of the image data may be shifted. Similar problems may be associated with the different color lamps used to illuminate the scan line 42 on the successive passes. For example, it is a rare circumstance where the red, green, and blue illumination sources all produce light of the same intensity and any such intensity variation will also manifest itself as a color shift in the resulting image data. The present invention, therefore, provides a convenient means for correcting color imbalances to produce more accurate color rendition of the resulting image data.

Other advantages associated with the ability to provide separate transfer functions to the various color components of the image data allow for the reversal of the color image data. That is, negative color images may be converted into to positive color images and vice-versa by providing inverse transform functions for each of the color components. The transfer functions can also be specifically tailored to compensate for color shifts associated with the particular device that will be used to display the scanned image. For example, the transfer functions may include corrections associated with a known color shift produced by a particular color CRT connected to the computer, therefore allowing for more accurate color reproduction of the image of the scanned document on the CRT display. Other color corrections can be incorporated into the transfer functions to correct for particular color imbalances associated with a specific color printer, which again improves the color accuracy of the printed image of the scanned object.

Still other advantages are associated with providing the transfer functions to the image processing circuitry associated with the scanner. For example, it is common that the image processing circuitry (e.g., 46) handles the digital image data as 10 or even 12-bit words, which represents a significantly higher resolution than the 8-bit image data words that can be accepted by most host computers 48. Transforming the image data while it is still represented as a 10 or 12 bit word, as opposed to a relatively low resolution 8-bit word, reduces errors and quantization effects, again resulting in improved image quality and color rendition. The system also allows the color correction transforms to be performed "on the fly," allowing the image to be scanned and the image data directly stored in the host computer 48 without the need to first launch a separate image editing program 79.

Having briefly described the imaging system 10 for applying separate color tonemaps according to the present invention, as well as some of its more significant features and advantages, the imaging system 10 will now be described in detail. Referring now to FIGS. 1–5 simultaneously, the imaging system 10 may comprise an image scanning device, such as an optical scanner, having a housing 22 with a top panel 14 which is configured to receive a transparent platen 16. The object or document 12 (FIG. 5) to be scanned may be placed image-side down on the transparent platen 16 to accomplish scanning. The carriage assembly 18 is slidably mounted within the scanner housing 22 and is moved back and forth underneath the transparent platen 16 by the displacement assembly 20.

Referring specifically now to FIGS. 2 and 3, the carriage assembly 18 may comprise a carriage housing 24 adapted to receive the multicolor light source assembly 26 and the slit aperture assembly 28, although a slit aperture 28 assembly is not always required. Carriage assembly 18 also includes the various components of the optical system 30. The carriage assembly 18 is mounted to the scanner housing 22 and displacement assembly 20 so that it may be moved relative to the transparent platen 16 and the object 12 supported thereon in a manner well-known in the art to produce a sweeping scan image of the object 12 at the image region 60 over the light sensitive surface 64 of detector or CCD array 62 (FIG. 4). Generally speaking, the displacement assembly 20 may comprise a drive motor 52 and a drive belt 54 for moving the carriage assembly 18 back and forth underneath the platen 16 along the scanning axis AA. However, since many different kinds of displacement assemblies 20 for accomplishing the foregoing functions are known and available to persons having ordinary skill in the art, and is not critical in achieving the objects of the present invention, the displacement assembly 20 will not be described in further detail.

The optical system 30 mounted within the carriage assembly 18 may comprise a plurality of mirrors 32, 34, and 36 mounted within the housing 24 so as to define a folded light path 56 that extends from the illuminated scan line 42 (FIG. 5) of the object 12, through aperture 56 and lens assembly 38 and onto the detector assembly 44. Again, since carriage assemblies of the type described above are known to persons having ordinary skill in the art, the particular carriage assembly 18 used in one preferred embodiment of the scanner 10 will not be described in further detail. However, by way of example, the structure of the optical scanner 10 may be similar or identical to the optical scanner described in U.S. Pat. No. 4,926,041 of Boyd et al. which is specifically incorporated herein by reference for all that it discloses.

It should be noted that while the scanner 10 shown and described herein accomplishes scanning by moving the light source and optical assemblies 26 and 30 (i.e., the carriage assembly 18) with respect to the object 12, it could just as easily accomplish scanning by moving the object 12 with respect to stationary illumination and optical assemblies, as would be obvious to persons having ordinary skill in the art. Such an alternative embodiment would incorporate stationary light source and optical assemblies (not shown) and a moveable platen (not shown) to move the object being scanned with respect to the fixed light source and optical assemblies.

The electronic control and image data processing system 46 captures image data from the detector system 44 and transforms the captured image data according to the transfer functions previously stored in the RAM 68. Referring now to FIG. 6, the electronic control and image data processing system 46 includes an analog amplifier 55 connected to the detector array 44 via a suitable line 61. The analog amplifier 55 receives a serial stream of charges from the CCD array 62 (FIG. 4) comprising the detector system 44 and sequentially converts each charge to an analog voltage. The analog-to-digital (A/D) converter 57 receives the analog voltages from the amplifier 55 over a line 63 and digitizes them. In one preferred embodiment, the A/D converter 57 produces a 12-bit digital word representing the varying intensity of the pixel represented by the received voltage. That is, the A/D converter produces a digital signal capable of representing $2^{12}$ (4096) levels that are linearly spaced. Accordingly, the 12-bit A/D converter 57 provides increased resolution (in this case by a factor of 16) over the resolution possible with an 8-bit image data word, which can only represent $2^8$ or 256 different levels.

Slave controller 58 controls the timing of the CCD array 62 (FIG. 4) and A/D converter 57 over respective control lines 65 and 67. Slave controller 58 receives the digitized data from the A/D converter 57 over bus 69, provides any required formatting and image processing and stores the digitized data in RAM 68 via bus 71. In addition, slave controller 58 manages the transfer of data from RAM 68 to the host computer 48 via host interface 53. Host computer 48 may be an image processing system or a general purpose computer. A master controller 66 is provided to initiate an image scanning operation and to set-up and supervise slave controller 58 via bus 73.

In one preferred embodiment, slave controller 58 includes an image processor 59, a format processor 78, a state control 94, and a direct memory access (DMA) controller 96. The state control 94 provides clock and other control signals to synchronize the operation of the CCD array 62 and A/D converter 57 via respective control lines 65 and 67. The DMA controller 96 controls the storage and removal of data from RAM 68. DMA controller 96 communicates with RAM 68 via bus 75 and with host interface 53 via bus 77.

Image processor 59 provides image processing capabilities and transforms the image data by applying them to the transfer functions previously loaded into RAM 68 in the manner summarized above. Image processor 59 may also provide additional image processing functions, such as, for example, altering the resolution of the digitized image from A/D converter 57. Format processor 78 allows the data format of the digitized image to be changed prior to being stored in RAM 68 and to the host interface 53. For example, format processor 78 may present the data representing the digitized image to RAM 68 in 1, 4, 8, 10 or 12 bits per pixel format.

In one preferred embodiment, slave controller 58 is implemented as an ASIC (application specific integrated circuit). Master controller 66 may comprise a general purpose microprocessor such as a Motorola 68HC11, available from Motorola, Inc., Schaumburg, Ill. CCD array 62 may comprise a Toshiba TCD137C, available from Toshiba America Electronic Components, Inc., Irvine, Calif.

As was summarized above, the present invention may utilize a separate transfer function for each color component of the scanned image data. That is, a separate transfer function may be applied to the red, green, and blue color component portions of the image data to improve color balance and/or correct for non-linearities. Referring now to FIGS. 8(a–c), the RAM 68 may be provided with a red transfer function 70, a green transfer function 72, and a blue transfer function 74. As shown, the three transfer functions 70, 72, and 74 have slightly different responses. The red transfer function 70 is non-linear, that is, relatively dark scanned or input data will be expanded or brightened to produce transformed or output data, whereas brighter input data signals will be slightly compressed or dimmed. The green transfer function 72 is nearly linear, expanding or "brightening" only to a slight degree dark input data, and only slightly compressing or "dimming" bright input data. The blue transfer function 74, on the other hand, is non-linear, substantially expanding or brightening dark input data and significantly compressing bright input data.

It should be understood that the foregoing red, green, and blue transfer functions 70, 72, and 74 are provided for explanation purposes only and are not necessarily representative of any particular transfer functions. Indeed, since the present invention can be supplied with any transfer function imaginable or practical, the present invention should not be regarded as limited to any particular transfer function or functions.

The desired transfer functions (e.g., 70, 72, and 74) are stored in RAM 68 as corresponding look-up tables. In one preferred embodiment, each look-up table comprises a 7-bit by 12-bit look-up table which is then piecewise linearly interpolated to 12 by 12. The primary advantage associated with using a 7-bit by 12 bit look-up table, as opposed to a 12-bit by 12-bit look-up table, is that it requires considerably less memory. While a less precise look-up table, such as an 8-bit by 8-bit table, could be used, such lower precision tables introduce an objectionable "stair step" effect into the data conversion process, particularly for the "gamma correction" transfer functions which will commonly be used.

For example, referring now to FIG. 9, the desired red gamma correction function (i.e., tonemap) 70, represents a continuous, non-linear curve which expands or brightens dark or low intensity input data and compresses or darkens higher intensity input data. If the red gamma correction function 70 is mapped as an 8-bit by 8-bit tonemap, the result will be a plurality of individual data points. If an interpolation process is used in conjunction with the look-up table, the resulting function of the look-up table will approximate the curve 81 which connects the various individual data points. As is readily seen in FIG. 9, the 8-bit by 8-bit curve 81 is characterized by a plurality of "stair steps." The stair step effect becomes particularly pronounced as the curve 70 flattens, i.e., becomes more horizontal. This stair-step effect is the result of the relatively coarse 8-bit output resolution, as indicated by arrows 91.

The stair-step effect can be reduced by increasing the output resolution. For example, if the output resolution is increased to 12-bits, the individual data points on the tonemap will be located at much closer intervals, as indicated by arrows 93. While a 12-bit by 12-bit look-up table would significantly reduce the magnitude of the stair-steps, it would also require a considerable amount of RAM, which is always in short supply. We have found that a 7-bit by 12-bit look-up table more closely follows the typical gamma correction transfer functions that will typically be used, but without requiring additional RAM.

Still referring to FIG. 9, if the continuous red gamma correction function 70 is mapped as a 7-bit by 12 bit tonemap, the resulting interpolated tonemap function, represented by curve 83, more accurately follows the flatter, nearly horizontal portions of the continuous red gamma correction function 70. The more accurate fit is a direct result of the relatively fine 12-bit output resolution (indicated by arrows 93). While the 7-bit by 12-bit look-up table function 83 does not follow as closely the continuous red gamma correction function 70 at low input intensities, i.e., at those more vertical portions of the curve 70, this small loss of accuracy is more than off-set by the increase accuracy in following the flatter portions of the continuous function 70. The reduced accuracy of the 7-bit by 12-bit look-up table for low input intensities is a result of the reduction of the width of the input word from 8-bits to 7-bits (as indicated by respective arrows 95 and 97).

With regard to memory requirements, the 7-bit by 12-bit tonemap actually requires less RAM than an 8-bit by 8-bit tonemap. For example, a single 7-bit by 12-bit tonemap requires only 1536 bits, whereas an 8-bit by 8-bit map would require 2048 bits.

The interpolation method used to "connect" the various individual data points of the 7-bit by 12-bit tonemap is best understood by referring to FIG. 10. Consider, for example, a hypothetical image data point (i.e., pixel) having a 12-bit intensity value. This is the input data and is referred to as "LatchedImage." Since the input resolution of the look-up table is only 7-bits, only two output points, namely "HiPoint" and "LowPoint," can be determined from the look-up table based on the value of LatchedImage. The present invention utilizes a linear interpolation algorithm to determine an "Output" value between the HiPoint and LowPoint values that more closely represents the output value that would be derived from the continuous red gamma correction curve 70 (FIG. 9).

The first step in the interpolation process is to take the top 7 bits of the 12 bit input word (i.e., LatchedImage). The top 7-bits of the 12-bit input word is called "TopImage." The image processor 59 (FIG. 6) then looks up the 12-bit output word in the tonemap stored in RAM 68 (FIG. 6) that corresponds to the TopImage input data point (i.e., the top 7-bits of the 12-bit LatchedImage word). This 12-bit output word is referred to as LowPoint. The image processor 59 also looks-up the 12-bit output word that corresponds to the next contiguous input data point (i.e., "TopImage+1"). The 12-bit output word that corresponds to TopImage+1 is referred to as "HiPoint." Considering again the original 12-bit input word (LatchedImage), the lower 5 bits of that 12-bit word are called the "Remainder." The two's complement of the Remainder is also calculated and called "Anti-Remainder." The 12-bit Output corresponding to the 12-bit input word LatchedImage is then calculated as follows:

Output=(HiPoint*Remainder)+(LowPoint*AntiRemainder)/32

For the special case where the lower 5 bits of LatchedImage are all 0 (i.e., LatchedImage=TopImage), the value for LowPoint is fetched from RAM and is passed on directly as Output. Similarly, if the value for LatchedImage is greater than the last point on the look-up table (i.e., LatchedImage >111111100000), TopImage+1 is off the tonemap, so the value for LowPoint again is used directly as Output.

In one preferred embodiment, the interpolation function can be turned off, in which case the top 7 bits of Latched-Image are used to look-up the corresponding LowPoint, i.e., the Output=LowPoint. Similarly, the entire tonemap function can be turned off, in which case the 12 bit LatchedImage value is sent directly on to the next module.

The 7-bit by 12-bit look-up tables may be generated in any of a number of ways. For example, the look-up tables may be provided with the scanner control software 76 (FIG. 7) and may be downloaded by the user (not shown), so that the image data are automatically transformed upon scanning. That is, the scanner 10 could be operated and the scanned image data captured and stored as a file 35 on the computer system 48 without the need to launch a separate image editing software program 79. Then, at some later time, the user could launch the image editing software 79 and further modify the image data before printing the data or storing them as an edited image data file 37. Alternatively, the scanner control software 76 could also allow the user to design custom tonemaps (i.e., transfer functions), then download the custom tonemaps to the imaging device or scanner 10.

The method 80 for processing image data is best seen in FIG. 11. The first step in the process 80 is to create the transfer functions to be applied to the image data. As was explained above, the particular transfer functions may be created by the user or may be selected by the user from a plurality of pre-programmed transfer functions which have been supplied with the scanner control software 76. In any event, once the user has either created or selected the desired transfer functions at step 82, the transfer functions are then downloaded onto the RAM 68 at step 84. Then, at any time subsequent to the downloading step 84, the scanner 10 may be actuated to scan the document 12 (FIG. 5). As the document 12 is being scanned, analog image data from the detector 44 are amplified by amplifier 55 and converted into digital image data by the analog-to-digital (A/D) converter 57. The digital image data may then be stored in RAM 68 or may be transformed "on the fly" by the image processor 59. In either case, the image processor 59 transforms the digital image data at step 88 by applying the data to the appropriate transfer function stored in RAM 68 as a 7-bit by 12-bit look-up table. For example, the red digital image data are transformed by applying them to the appropriate transfer function previously input for red image data. Similarly, the green digital image data are transformed by applying them to the previously input "green" transfer function, and so on. After all the image data have been transformed, they are then formatted, if necessary, at step 90 to place the data in a form suitable for transfer to the host computer 48. For example, in one preferred embodiment, the transformed image data comprise 12-bit image data, but the host computer 48 will only accept 8-bit data. Therefore, the 12-bit transformed image data are converted into 8-bit image data by the format processor 61 (FIG. 6). The formatted, transformed image data may then be sent to the host processor 48 via a suitable host interface 53 at step 92.

It is contemplated that the inventive concepts herein described may be variously otherwise embodied and it is intended that the appended claims be construed to include alternative embodiments of the invention except insofar as limited by the prior art.

What is claimed is:

1. An imaging device, comprising:

an optical scanning assembly configured to scan an object and produce image data having a first resolution, said image data corresponding to a color characteristic;

a memory device for storing a look-up table, said look-up table corresponding to a predetermined transfer function;

an image data processor operatively associated with said memory device and said optical scanning assembly, said image data processor altering the resolution of the image data having said first resolution to produce image data having a second resolution, said second resolution being less than said first resolution and applying said image data having said second resolution to said look-up table to look up LowPoint image data having a third resolution, said third resolution being greater than said second resolution.

2. The imaging device of claim 1, wherein said optical scanning assembly produces a red group of image data, a green group of image data, and a blue group of image data, wherein said memory device stores a red look-up table, a green look-up table, and a blue look-up table.

3. The imaging device of claim 1, wherein said optical scanning assembly comprises a charge coupled device (CCD) sensor configured to be passed over the image and produce a plurality of charges in response to light incident thereon; an amplifier for receiving said charges and for converting said charges to analog voltages; and an analog-to-digital converter for digitizing said analog voltages to produce digitized voltages.

4. An imaging device, comprising:

an optical scanning assembly including a detector assembly, a lens assembly for focusing light from an object onto said detector assembly, and a color selector assembly, said color selector assembly being operatively associated with said optical scanning assembly so that said detector assembly produces a plurality of separate groups of image data having a first resolution, each of said plurality of separate groups of image data corresponding to a different color characteristic;

a memory device including a plurality of memory cells for storing a plurality of look-up tables, each of said plurality of look-up tables corresponding to a predetermined transfer function; and an image data processor operatively associated with said detector assembly and said memory device, said image data processor altering the resolution of each of the separate groups of image data having said first resolution to produce a plurality of separate groups of image data having a second resolution, said second resolution being less than said first resolution and applying selected ones of said plurality of separate groups of image data having said second resolution to selected ones of said plurality of look-up tables to look up corresponding LowPoint image data having a third resolution, said third resolution being greater than said second resolution.

5. The imaging device of claim 4, wherein said color selector assembly selects image light of about a color red, about a color green, and about a color blue, so that said detector assembly produces a red group of image data, a green group of image data, and a blue group of image data, wherein said memory device stores a red look-up table, a green look-up table, and a blue look-up table.

6. An imaging device, comprising:

an optical scanning assembly configured to scan an object and produce a red group of image data having a first resolution, a green group of image data having a first resolution, and a blue group of image data having a first resolution;

a memory device for storing a red look-up table, a green look-up table, and a blue look-up table;

an image data processor operatively associated with said memory device and said optical scanning assembly, said image data processor altering the resolution of each of said red, green, and blue groups of image data having said first resolution to produce corresponding red, green, and blue image data having a second resolution, said second resolution being less than said first resolution and applying the red, green, and blue image data having said second resolution to the red, green, and blue look-up tables, respectively, to look up corresponding red, green, and blue LowPoint image data having a third resolution, said third resolution being greater than said second resolution.

7. A method for processing image data having a first resolution, the image data corresponding to a color characteristic, comprising:

providing to an imaging device a look-up table, said look-up table being representative of a predetermined transfer function; and said imaging device, altering the resolution of said image data having said first resolution to produce image data having a second resolution, said second resolution being less than said first resolution; and applying said image data having said second resolution to said look-up table to look up LowPoint image data having a third resolution, said third resolution being greater than said second resolution.

8. The method of claim 7, wherein said image data comprises a red group of image data, a green group of image data, and a blue group of image data and wherein said look-up table comprises a red look-up table, a green look-up table, and a blue look-up table.

9. The method of claim 7, wherein said look-up table is representative of a gamma correction function that has the property of increasing contrast in a dark area and decreasing contrast in a light area.

10. The method of claim 7, wherein said first resolution and said third resolution are equal.

11. The method of claim 7, wherein:

said image data having said first resolution comprises an n-bit data word; and altering the resolution of said image data having said first resolution to produce image data having a second resolution comprises discarding a number of lower bits in said n-bit data word.

12. The method of claim 7, further comprising:

said imaging device outputting said LowPoint image data as transformed image data.

13. The method of claim 7, further comprising:
said imaging device,
    formatting said LowPoint image data; and
    outputting said formatted LowPoint image data as transformed image data.

14. The method of claim 7, further comprising:
said imaging device,
    incrementing said image data having said second resolution;
    applying said incremented image data to said look-up table to look up HiPoint image data having said third resolution; and
    interpolating, using said LowPoint image data, said HiPoint image data, and said image data having said first resolution, image data which closely approximates said predetermined transfer function.

15. The method of claim 14, wherein said interpolating comprises piecewise linearly interpolating.

16. The method of claim 7, further comprising:
said imaging device,
    incrementing said image data having said second resolution;
    applying said incremented image data to said look-up table to look up HiPoint image data having said third resolution; and
    interpolating, using said LowPoint image data, said HiPoint image data, and a Remainder comprising a number of lower bits of said image data having said first resolution, image data which closely approximates said predetermined transfer function.

17. The method of claim 16, wherein said image data which closely approximates said predetermined transfer function is interpolated by:
    calculating an AntiRemainder which is the two's complement of said Remainder; and
    calculating a value for said image data which closely approximates said predetermined transfer function as: (HiPoint*Remainder)+(LowPoint*AntiRemainder)/32.

18. A method for processing a plurality of separate groups of image data having a first resolution, each of the separate groups of image data corresponding to a different color characteristic, comprising:
    providing to an imaging device a plurality of look-up tables, each of said look-up tables being representative of a predetermined transfer function; and
    said imaging device,
        altering the resolution of each of the separate groups of image data having said first resolution to produce a plurality of separate groups of image data having a second resolution, said second resolution being less than said first resolution; and
        applying selected ones of said plurality of separate groups of image data having said second resolution to selected ones of said plurality of look-up tables to look up corresponding LowPoint image data having a third resolution, said third resolution being greater than said second resolution.

* * * * *